United States Patent
Rowe

(10) Patent No.: US 9,477,862 B1
(45) Date of Patent: Oct. 25, 2016

(54) VERIFYING PANELIST IDENTITY

(71) Applicant: Google Inc., Mountain View, CA (US)

(72) Inventor: Simon Michael Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 14/078,166

(22) Filed: Nov. 12, 2013

(51) Int. Cl.
 *G06F 21/36* (2013.01)
 *G06K 7/08* (2006.01)
 *G06K 7/10* (2006.01)

(52) U.S. Cl.
 CPC .................. *G06K 7/10366* (2013.01)

(58) Field of Classification Search
 CPC ............. G06K 7/10475; G06K 7/10366
 USPC ....... 340/5.7, 5.8, 5.81, 7.2, 686.6; 707/736; 725/9, 11; 705/10
 See application file for complete search history.

(56) References Cited

U.S. PATENT DOCUMENTS

| | | | |
|---|---|---|---|
| 5,758,126 A * | 5/1998 | Daniels | G06Q 40/04 705/37 |
| 7,172,115 B2 * | 2/2007 | Lauden | G07C 9/00087 235/380 |
| 7,961,913 B2 * | 6/2011 | Andersson | G06K 19/07354 382/115 |
| 8,294,549 B2 | 10/2012 | Samovar et al. | |
| 8,315,620 B1 * | 11/2012 | Williamson | H04W 4/001 455/418 |
| 2006/0111962 A1 * | 5/2006 | Holsinger | G06Q 30/02 705/7.32 |
| 2008/0148370 A1 * | 6/2008 | Allwright | 726/5 |
| 2010/0280955 A1 | 11/2010 | Ross et al. | |
| 2012/0133483 A1 | 5/2012 | Zatloukal et al. | |

* cited by examiner

*Primary Examiner* — Andrew Bee
*Assistant Examiner* — Mancil Littlejohn, Jr.
(74) *Attorney, Agent, or Firm* — Foley & Lardner LLP; John D. Lanza

(57) ABSTRACT

A personal identification process executed by a processor includes receiving personal identification data; encoding, by the processor, the received personal identification information; sending the encoded personal identification information to a data element; receiving a comparison result executed by the data element of the sent encoded personal identification information and corresponding personal identification information stored on the data element; and providing the comparison result to a remote server.

20 Claims, 3 Drawing Sheets

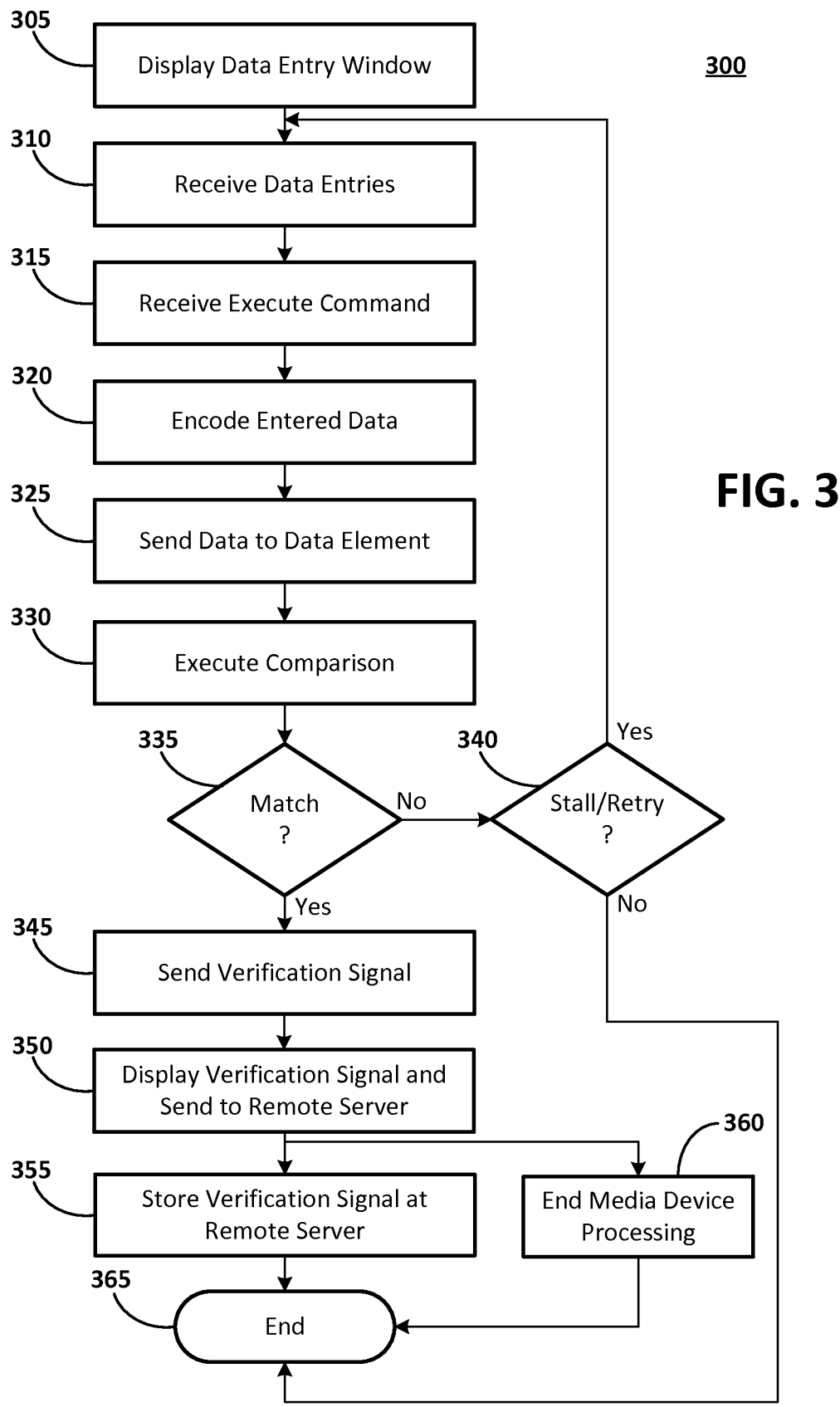

VERIFYING PANELIST IDENTITY

BACKGROUND

A panel is a collection of recruited individuals who agree to the collection of data related to some aspect of their behavior, usually in return for compensation. Panels may be used for a single media outlet, such as over-the-air broadcast television program viewing, product purchases, and Internet Web browsing. A single source panel (SSP) may combine many different behavioral aspects.

Careful selection of panelists is an important aspect of panel creation. Ideally a panel creator would be able to verify the identity of each panelist. This is so because the panel may be designed to evaluate behavioral aspects of different demographic groups within the larger population of which the panel is a sample. A panel may be designed to have X panelists with demographics A; panelists with demographics B; and Z panelists with demographics C. The accuracy and value of panel results are tied directly to how accurately the actual panel demographics match the panel design demographics.

Furthermore, a panel creator may find that recruiting panelists with demographics C is much harder than those with demographics A, and thus the panel creator may feel compelled to offer greater incentives to potential panelists with demographics C than those with demographics A. Knowing this, potential panelists with demographics A may provide false information to the panel creator so as to obtain the greater incentives.

SUMMARY

A personal identification process executed by a processor includes receiving personal identification data; encoding, by the processor, the received personal identification information; sending the encoded personal identification information to a data element; receiving a comparison result executed by the data element of the sent encoded personal identification information and corresponding personal identification information stored on the data element; and providing the comparison result to a remote server.

A personal identification verification system includes a data element having stored thereon an electronic version of personal identification data of a person; and a media device remote from the data element. The media device includes a computer readable medium having stored thereon instructions for executing a personal verification process, and a processor that executes the instructions to receive a personal identification data entry from the person; encode the received data in a format compatible with the data element; send the encoded data to the data element; receive a comparison result executed by the data element comparing the received encoded data to the electronic version of the personal identification data; and display the comparison result.

A processor-implemented method for verifying an identity of a panelist includes receiving from the panelist personal identification data corresponding to data stored in a scannable data element of a document; encoding the received panelist personal identification data to a format compatible with the data in the data element of the document; receiving, from the data element, results of a comparison process comparing the encoded data with the stored data; displaying the results to the panelist; and sending the results to a remote server.

A computer readable storage medium having encoded thereon machine instructions executed by a processor for verifying an identity of a person, the instructions when executed, causing the processor to receive a personal identification data entry from the person; encode the received data in a format compatible with a data element having stored thereon an electronic version of the personal identification data of the person; send the encoded data to the data element; receive a comparison result executed by the data element comparing the received encoded data to the electronic version of the personal identification data; and display the comparison result.

DESCRIPTION OF THE DRAWINGS

The detailed description refers to the following figures in which like numerals refer to like items and in which:

FIG. 3 is a flow chart illustrating an example panelist identity verification method.

DETAILED DESCRIPTION

Panel creators may want to ensure that the panelists they recruit actually match the intended panel demographics. For example a panel design may ask for X males in a certain income group. Some potential panelists may be tempted to falsify their demographic details in the hope of being selected as a panelists (considering that panelists may be compensated for allowing their behaviors to be monitored).

Disclosed herein are systems and associated methods for verifying the identity of a potential panelist (referred to hereafter simply as a panelist). In an aspect a panelist scans an official identification document that incorporates a readable data element encoded with the panelist's identity data. In an aspect, the panelist signals identity data to the data element and the data element compares the signaled identity information to that stored in the data element. In another aspect, an output or scan file of the data read from the data element is used to verify the panelist's identity.

The system and methods may exploit the fact that certain data elements include limited processing capabilities that are sufficient to execute an identity verification process. The systems and methods also may exploit the fact that modern mobile media devices such as smart phones either have or are capable of having the capability to read a data element incorporated into an identity document. In either aspect, a panelist may use a smart phone to verify his identity as a prelude to assignment to a panel. More specifically, the panelist may fill out a panel application and provide certain personal information that also is contained in the readable data element. In an aspect, the panel application is provided electronically by a panel creator. The panelist then scans the data element to verify his identity. Thus, the panelist application, and verification process, may be completed electronically, using, for example, an application executing on the smart phone.

Examples of identification documents containing readable data elements include passports. Examples of readable data elements include passive radio frequency identification (RFID) tags. Such RFID tags may include limited processing capabilities.

Figure 1:
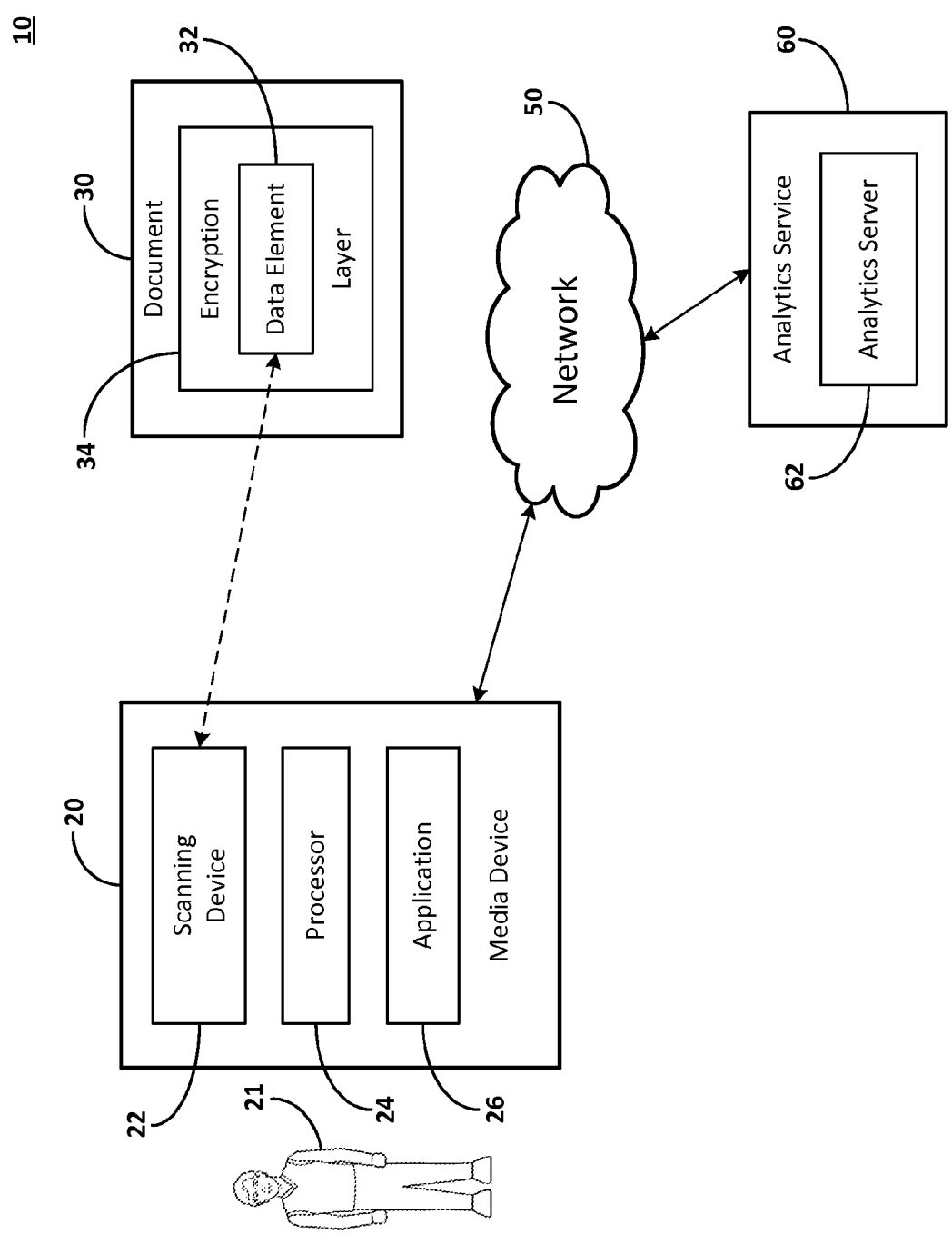
FIG. 1 illustrates an example environment in which panelist identity may be verified.

FIG. 1 illustrates an example environment in which an identification verification system may operate. In FIG. 1, environment 10 includes mobile media device 20 and analytics service 60 coupled by network 50. Also shown is an identification document (e.g., a passport) 30.

The mobile media device 20 may be a tablet, a smart phone, or a lap top computer, for example. The mobile media device 20 includes components of a system 100 for verifying an identity of (potential) panelist 21. The mobile media device 20 includes a scanning device 22, a processor 24, and instructions 26 for reading a data element.

Some operations executed in the environment 10, including the herein disclosed identity verification methods, may involve collection and use of a panelist's personal information. However, panelists 21 agree to being measured, and that this information may be provided by the panelist 21 voluntarily as a part of the panelist application process, and during subsequent panel operations. Furthermore, individual panelists 21 would agree to sign in to measurement, but any measurement may be suspended at any time (incognito) by a panelist 21. For example, a panelist 21 may register with the analytics service 60 or otherwise agree to serve as a panelist and may provide information such as a password and user ID. In situations in which the systems disclosed herein collect personal information about the panelists 21, or may make use of personal information, the panelists 21 may be provided with an opportunity to control whether programs or features collect panelist traffic (e.g., information about an panelist's social network, social actions or activities, profession, an panelist's preferences, or an panelist's current location), or to control whether and/or how to receive content that may be relevant or of interest to the panelist. In addition, certain data may be treated in one or more ways before it is stored or used, so that personally identifiable information is removed. For example, a panelist's identity may be treated so that no personally identifiable information can be determined for the panelist 21, or a panelist's geographic location may be generalized where location information is obtained (such as to a city, ZIP code, or state level), so that a particular location of a panelist 21 cannot be determined. Thus, the panelist 21 may have control over what information is collected about the panelist 21, how that information is collected, and how the collected information is used.

Identification document 30 includes data element 32, which in an embodiment, is a passive RFID tag. The data element 32 may be protected by an encryption layer 34. Other types of data elements may be used with the document 30.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the media device 20 and the analytics service 60 across a wire line or a wireless link. While illustrated as a single or continuous network, the network 50 may be divided logically into various sub-nets or virtual networks, so long as at least a portion of the network 50 may facilitate communications among the entitles of FIG. 1.

The analytics service 60 supports creation of panels. One aspect of operation of the analytics service 60 is verification of panelist identities. The analytics service 60 includes analytics server 62, which communicates with mobile media device 20 over network 50. The server 62 includes components of the system 100.

Figure 2:
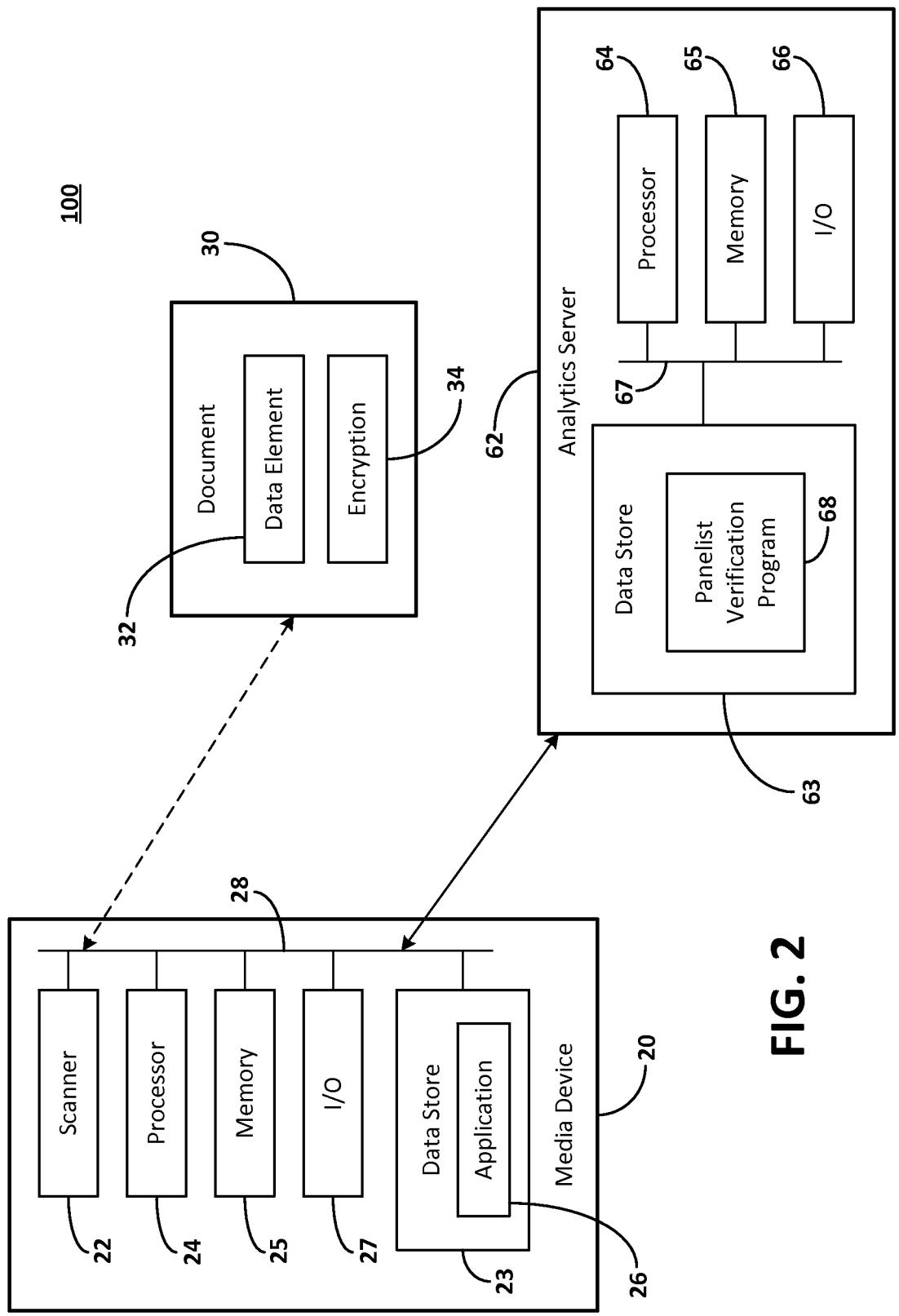
FIG. 2 illustrates an example system that verifies panelist identity.

FIG. 2 illustrates an example panelist verification system. In FIG. 2, system 100 includes, in media device 20, scanner 22, data store 23, processor 24, memory 25, identity verification application 26, input/output 27, and communications bus 28. The data store 23 includes or is a computer readable storage medium on which the identify verification application 26 is stored. The processor 24 reads the instructions of the application 26 into memory 25 and then executes the instructions. The I/O 27 allows machine-to-machine and man-to-machine communications. The bus 28 provides for communications among the components of the media device 20. The scanner 22 communicates with data element 32 in the document 30.

The analytics server 62 includes data store 63, processor 64, memory 65, I/O 66, and communications bus 67. The data store 63 includes a computer readable storage medium on which is stored panelist verification program 68.

The document 30 includes data element 32. In an embodiment, the data element 32 is a smart chip or RFID tag having limited processing capability. The data element 32 may include an encryption layer 34.

In operation, components of the system 100 installed on the media device 20 signal panelist data, such as name, age, passport number (i.e., all or some of the data contained on the passport information page), which the panelist manually enters using a text entry window provided by the application 26, to the data element 32. The panelist 21 also may enter a picture (e.g., a copy of the passport photo) in a data entry window. The data element 32 compares the signaled data to that stored in the data element 32. If the data match, the data element 32 sends a verified signal to the media device 20. If the data do not match, the data element 32 sends no signal. Alternately, the data element 32 sends a failed signal.

When the media device 20 receives the verified signal from the data element 32, the media device 20 forwards the verified signal to the analytics server 62. The analytics server 62, executing the panelist verification program 68, marks the panelist as acceptable, and stores an acceptance signal in the data store 63.

Note that in executing a verification process, the document 30 sends no personal information to either the media device 20 or the server 62. Instead, all verification processing executes on the data element 32, and only a verification signal is provided.

Alternately, the media device 20 could read and cache data from the data element, and the processor 24 could execute the comparison and verification processes. However, the processor 24 would not store the personal data contained in the data element and read therefrom, other than caching the data for the duration of the verification process.

FIG. 3 is a flowchart illustrating an example method for verifying the identity of the panelist 21.

In FIG. 3, method 300 begins in block 305 when a panelist 21 accesses application 26 on media device 20, and the processor 24 displays a data entry window. In block 310, the panelist 21 enters data from the document 30 into the data entry window. In an embodiment, the panelist 21 may be required to enter certain mandatory information before the method 300 continues. In block 315, the application 26 receives an enter or execute command from the panelist 21. In block 320, the processor encodes the entered data into a format recognized by the data element 32. In block 325, the media device 20 provides the encoded data to the data element 32. In block 330, the data element 32 executes a comparison process to verify the encoded data matches that stored in the data element 32. If a match does not exist, in block 335, the method 300 stalls awaiting another attempt at data entry by the panelist 21, if no further verification attempts are made within a threshold time, the method moves to block 365 and ends.

If a match exists as determined in block 335, the method 300 moves to block 345, and the data element 32 provides a verification signal to the media device 20. In block 350, the processor 24 displays a verified signal to the panelist 21 and sends the verified signal to the analytics server 62. In block 355, the analytics server, executing program 68, stores the identity verified signal for the panelist 21 in the data store 63. Following transmission of the verified signal to the analytics server 62, in block 360 the method 300 as executed at the media device 20 ends. Following storage of the identity verified signal in the data store 63, in block 365, the method 300 as executed in the analytics server 62 ends.

In addition to the above process blocks, the a method may involve penetrating an encryption layer provided with the data element. In one aspect, the panelist 21 may be asked to provide a personal identification number (PIN) or a thumbprint, either of which would be pre-registered with the data element 32. The data element 32 would execute a verification process before proceeding with verification of the personal identification information.

Certain of the devices shown in FIGS. 1 and 2 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during startup. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIG. 3. The disclosed devices, components, and systems contemplate using or implementing any suitable technique for performing the steps illustrated. Thus, FIG. 3 is for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A method for verifying panelist identity, comprising:
   receiving, at a processor of a computing device, data entered into a text entry window provided by the computing device by a user, the data comprising information about the user;
   encoding, by the processor, the data into a first signal recognizable by a data element in an identification document;
   sending, from the computing device, the first signal to the data element of the identification document;

receiving, by the computing device from the data element, a verification signal generated by the data element based on a match between the first signal and a second signal stored on the data element, wherein the verification signal does not include the information about the user; and providing, by the computing device, the verification signal to a remote server, the remote server marking the user as a panelist based on the verification signal.

2. The method of claim 1, wherein the data element is a passive RFID tag.

3. The method of claim 1, wherein the data element determines that the second signal does not match the first signal and, based on the determination, sends a failure signal to the computing device.

4. The method of claim 3, further comprising:
receiving, by the computing device from the data element, the failure signal;
providing, by the computing device, a prompt to the user to reenter the data.

5. The method of claim 1, further comprising:
providing, by the computing device to the user, a data entry form for receiving the personal identification information; and
checking, by the processor, the data are entered correctly in the data entry form before encoding the data.

6. The method of claim 5, further comprising providing a prompt to the user to change an incorrect data entry.

7. The method of claim 1, further comprising:
receiving, at the processor, second data entered into the text entry window by the user;
encoding, by the processor, the second data into a third signal;
sending, from the computing device, the third signal to the data element of the identification document;
receiving, by the computing device from the data element, no verification signal within a predetermined expiration time; and
providing, by the computing device, a negative verification signal to the remote server, the remote server marking the user as unacceptable to be a panelist based on the negative verification signal.

8. The method of claim 1, wherein the data element includes an encryption layer, the method further comprising:
receiving a personal security verification entered by the user;
sending the personal security verification to the data element; and
receiving a personal security verification accepted signal from the data element based on an acceptance of the personal security verification by the data element, wherein the data element will not proceed with verification of the first signal prior to acceptance of the personal security verification.

9. The method of claim 8, wherein the personal security verification is a personal identification number.

10. A system for verifying panelist identity, comprising:
a media device remote from a remote server, the media device comprising:
a non-transitory computer readable medium having stored thereon instructions for executing a personal verification process, and
a processor that executes the instructions to:
receive data entered into a text entry window provided by the computing device by a user, the data comprising information about the user;
encode the data into a first signal recognizable by a data element in an identification document;
send the first signal to the data element of the identification document;
receive a verification signal generated by the data element based on a match between the first signal and a second signal stored on the data element, wherein the verification signal does not include the information about the user; and
provide the verification signal to a remote server, the remote server marking the user as a panelist based on the verification signal.

11. The system of claim 10, wherein the data element determines that the second signal does not match the first signal and, based on the determination, sends a failure signal to the computing device.

12. The system of claim 10, wherein the data element includes an encryption layer and wherein the processor further:
receives a personal security verification entered by the user;
sends the personal security verification to the data element; and
receives a personal security verification accepted signal from the data element based on an acceptance of the personal security verification by the data element, wherein the data element will not proceed with verification of the first signal prior to acceptance of the personal security verification.

13. The system of claim 12, wherein the personal security verification is a thumbprint.

14. The system of claim 10, wherein the data element is a passive RFID tag.

15. A non-transitory computer readable storage medium having encoded thereon machine instructions executed by a processor for verifying panelist identity, the instructions when executed, causing the processor to:
receive data entered into a text entry window provided by the computing device by a user, the data comprising information about the user;
encode the data into a first signal recognizable by a data element in an identification document;
send the first signal to the data element of the identification document;
receive a verification signal generated by the data element based on a match between the first signal and a second signal stored on the data element, wherein the verification signal does not include the information about the user; and
provide the verification signal to a remote server, the remote server marking the user as a panelist based on the verification signal.

16. The non-transitory computer readable storage medium of claim 15, wherein the data element includes an encryption layer and wherein the processor further:
receives a personal security verification entered by the user;
sends the personal security verification to the data element; and
receives a personal security verification accepted signal from the data element based on an acceptance of the personal security verification by the data element, wherein the data element will not proceed with verification of the first signal prior to acceptance of the personal security verification.

17. The non-transitory computer readable storage medium of claim 15, wherein the data element is a passive RFID tag.

18. The system of claim 11, the processor further executing instructions to:
   receive the failure signal from the data element;
   provide a prompt to the user reenter the data.

19. The system of claim 11, the processor further executing instructions to:
   provide a data entry form to the user for receiving the personal identification information; and
   check the data are entered correctly in the data entry form before encoding the data.

20. The system of claim 19, the processor further executing instructions to provide a prompt to the user to change an incorrect data entry.

\* \* \* \* \*